United States Patent
Yamazaki (10) Patent No.: US 7,854,879 B2
(45) Date of Patent: Dec. 21, 2010

(54) OPTICAL ELEMENT MOLDING DIE, AND OPTICAL ELEMENT MANUFACTURING METHOD

(75) Inventor: Hiroshi Yamazaki, Kawaguchi (JP)

(73) Assignee: Enplas Corporation, Saitama (JP)

( * ) Notice: Subject to any disclaimer, the term of this patent is extended or adjusted under 35 U.S.C. 154(b) by 6 days.

(21) Appl. No.: 12/380,625

(22) Filed: Mar. 2, 2009

(65) Prior Publication Data
US 2009/0230581 A1    Sep. 17, 2009

Related U.S. Application Data

(62) Division of application No. 11/285,099, filed on Nov. 21, 2005, now Pat. No. 7,525,742.

(30) Foreign Application Priority Data

Dec. 1, 2004    (JP)    ............... 2004-348660

(51) Int. Cl.
*H05B 6/00*    (2006.01)
(52) U.S. Cl. ...................... 264/478; 359/811
(58) Field of Classification Search ........... 359/811, 359/812, 818, 819; 264/478, 1.32; 425/542, 425/808
See application file for complete search history.

(56) References Cited

U.S. PATENT DOCUMENTS

| 5,805,355 | A | 9/1998 | Natsuno |
| 5,960,951 | A | 10/1999 | Nomura et al. |
| 2006/0093700 | A1* | 5/2006 | Naito et al. ............ 425/542 |

FOREIGN PATENT DOCUMENTS

JP    H5-177725    7/1993

* cited by examiner

*Primary Examiner*—Joseph Martinez
(74) *Attorney, Agent, or Firm*—William L. Androlia; H. Henry Koda (57) ABSTRACT

It is to provide an optical element, an optical element molding die, and an optical element manufacturing method, which can easily but surely suppress generation of transcription failure of a resin material and also enables to manufacture an optical element with an excellent optical performance at a low cost while improving the yield. In an optical element formed with a resin material, a gate part is formed on a side face of an optical element main body, and a ratio of the thickness of the gate part with respect to the thickness of an optical function part of the optical element main body is set as 50% or more.

6 Claims, 4 Drawing Sheets

OPTICAL ELEMENT MOLDING DIE, AND OPTICAL ELEMENT MANUFACTURING METHOD

BACKGROUND OF THE INVENTION

1. Field of the Invention

The present invention relates to an optical element, an optical element molding die, and an optical element manufacturing method and, more specifically, to an optical element, an optical element molding die, and an optical element manufacturing method, which are suited for manufacturing an optical element through resin molding.

2. Description of the Related Art

Conventionally, an injection molding method using a resin material (plastic and the like) has been employed for manufacturing resin-made lenses.

At the time of performing such injection molding, a molten resin material is injected and filled into a cavity where a lens is molded, through a spool, a runner, and a gate, which are the passageway provided in a die for the resin material.

Then, by cooling the molten resin material filled in the cavity along with the molten material filled in the spool, runner, and the gate, the molten resin material is cured, thereby forming a molded lens item in which the molded part (a lens main body) in the cavity and the molded part in the spool, the runner, and the gate are integrally molded.

However, conventionally, there have been a plurality of minute granular concaves, which are referred to as transcription failure, formed on the surface of the lens.

Such transcription failure of the resin material extremely deteriorates the optical performance of the lens. Thus, there has been a demand for finding an effective solution.

In order to overcome the problem of such transcription failure of the resin material, there has been proposed a manufacturing method as disclosed in Patent Document 1, for example, which aims to form a flat lens face with no transcription failure by adjusting the temperature of the resin material to a preferable value. Patent Document 1: Japanese Patent Unexamined Publication 5-177725.

However, in the invention disclosed in Patent Document 1, there is still a specific limitation in controlling the temperatures of the resin material. Therefore, it is difficult to easily suppress the generation of the transcription failure.

As a result of devoted research, the inventors of the present invention have found that there is a correlation between the ratio of the gate thickness to the lens thickness and the generation rate of the transcription failure, and also a correlation between the ratio of the cross sectional area in the thickness direction of the gate with respect to the cross sectional area of the thickness direction of the lens and the generation rate of the transcription failure, which resulted in inventing the present invention.

SUMMARY OF THE INVENTION

The present invention has been designed in view of the aforementioned respects. An object of the present invention is to easily but surely suppress the generation of the transcription failure of the resin material, and to provide an optical element, an optical element molding die, and an optical element manufacturing method, which can manufacture an optical element with an excellent optical performance at a low cost while improving the yield.

In order to achieve the aforementioned object, an optical element according to a first aspect of the present invention is an optical element which is molded with a resin material, wherein: a gate part is formed on a side face of an optical element main body; and a ratio of thickness of the gate part with respect to thickness of an optical function part of the optical element main body is set as 50% or more.

With the first aspect of the present invention, the ratio of the thickness of the gate with respect to the thickness of the optical function part of the optical element main body can be set as a preferable value for suppressing the transcription failure of the resin material.

The optical function part of the optical element main body herein means a part which is associated with the optical performance of the optical element main body.

For example, in the case where the optical element main body is a lens main body, the optical function part refers only to the part of the lens main body with a lens face. A flange part, which is formed in the periphery of the lens face when necessary, and a lens barrel part are not considered as the optical function part although they are included in the lens main body (it is the same hereinafter).

The optical element according to a second aspect is an optical element which is molded with a resin material, wherein: a gate part is formed on a side face of an optical element main body; and a ratio of a cross sectional area in a thickness direction of the gate part with respect to a cross sectional area in a thickness direction of an optical function part of the optical element main body is set as 50% or more.

With the second aspect of the present invention, the ratio of the cross sectional area in the thickness direction of the gate with respect to the cross sectional area in the thickness direction of the optical function part of the optical element main body can be set as a preferable value for suppressing the transcription failure of the resin material.

The optical element according to a third aspect is an optical element which is molded with a resin material, wherein: a gate part is formed on a side face of an optical element main body; a ratio of thickness of the gate part with respect to thickness of an optical function part of the optical element main body is set as 50% or more; and a ratio of a cross sectional area in a thickness direction of the gate part with respect to a cross sectional area in a thickness direction of an optical function part of the optical element main body is set as 50% or more.

With the third aspect of the present invention, the ratio of the thickness of the gate with respect to the thickness of the optical function part of the optical element main body, and the ratio of the cross sectional area in the thickness direction of the gate with respect to the cross sectional area in the thickness direction of the optical function part of the optical element main body can both be set as the preferable values for suppressing the transcription failure of the resin material.

The optical element according to a fourth aspect is the optical element according to any one of the first to third aspects, wherein the gate part is formed at a position that faces towards a center part of a cross section in a thickness direction of the optical function part of the optical element main body.

With the fourth aspect of the present invention, further, the gate part can be formed at a position which is more preferable for suppressing the transcription failure of the resin material.

The optical element according to a fifth aspect is the optical element according to any one of the first to third aspects, wherein the optical element is a lens.

With the fifth aspect of the present invention, further, the lens can be formed in a shape which is preferable for suppressing the transcription failure of the resin material.

The optical element according to a sixth aspect is the optical element according to fourth aspect, wherein the optical element is a lens.

With the sixth aspect of the present invention, further, the lens can be formed in a shape which is preferable for suppressing the transcription failure of the resin material.

The optical element molding die according to a seventh aspect is an optical element molding die which comprises a cavity for filling a resin material and a gate through which the resin material flows when filling the resin material to the cavity, wherein: the gate is formed at a position which corresponds to a side face of an optical element main body molded in the cavity; and a ratio of thickness of the gate with respect to thickness of a part in the cavity where an optical function part of the optical element main body is molded is set as 50% or more.

With the eighth aspect of the present invention, the ratio of the thickness of the gate with respect to the thickness of the part in the cavity where the optical function part of the optical element main body is molded can be set as a preferable value for suppressing the transcription failure of the resin material.

The optical element molding die according to an eighth aspect is an optical element molding die which comprises a cavity for filling a resin material and a gate through which the resin material flows when filling the resin material to the cavity, wherein: the gate is formed at a position which corresponds to a side face of an optical element main body molded in the cavity; and a ratio of a cross sectional area in a thickness direction of the gate with respect to a cross sectional area in a thickness direction of a part in the cavity where an optical function part of the optical element main body is molded is set as 50% or more.

With the eighth aspect of the present invention, the ratio of the cross sectional area in the thickness direction of the gate with respect to the cross sectional area in the thickness direction of the part in the cavity where the optical function part of the optical element main body is molded can be set as a preferable value for suppressing the transcription failure of the resin material.

The optical element molding die according to a ninth aspect is an optical element molding die which comprises a cavity for filling a resin material and a gate through which the resin material flows when filling the resin material to the cavity, wherein: the gate is formed at a position which corresponds to a side face of an optical element main body molded in the cavity; a ratio of thickness of the gate with respect to thickness of a part in the cavity where an optical function part of the optical element main body is molded is set as 50% or more; and a ratio of a cross sectional area in a thickness direction of the gate with respect to a cross sectional area in a thickness direction of a part in the cavity where an optical function part of the optical element main body is molded is set as 50% or more.

With the ninth aspect of the present invention, the ratio of the thickness of the gate with respect to the thickness of the part in the cavity where the optical function part of the optical element main body is molded, and the ratio of the cross sectional area in the thickness direction of the gate with respect to the cross sectional area in the thickness direction of the part in the cavity where the optical function part of the optical element main body is molded can both be set as preferable values for suppressing the transcription failure of the resin material.

The optical element molding die according to a tenth aspect is an optical element molding die according to any one of the seventh to ninth aspects, wherein the gate part is formed at a position that faces towards a center part of a cross section in a thickness direction of the optical function part of the optical element main body.

With the tenth aspect of the present invention, further, the gate can be formed at a position which is more preferable for suppressing the transcription failure of the resin material.

The optical element molding die according to an eleventh aspect is the optical element molding die according to any one of the seventh to ninth aspects, wherein the optical element is a lens.

With the eleventh aspect of the present invention, further, the shape of the die can be formed in a shape which is preferable for suppressing the transcription failure of the resin material.

The optical element molding die according to a twelfth aspect is the optical element molding die according to the tenth aspect, wherein the optical element is a lens.

With the twelfth aspect of the present invention, further, the shape of the die can be formed in a shape which is preferable for suppressing the transcription failure of the resin material.

The optical element manufacturing method according to a thirteenth aspect is an optical element manufacturing method which manufactures an optical element through resin molding by curing a molten resin material that is filled into a cavity though a gate, wherein, under a state where the gate is formed at a position which corresponds to a side face of an optical element main body molded in the cavity, the optical element is manufactured by setting a ratio of thickness of the gate with respect to thickness of a part in the cavity where an optical function part of the optical element main body is molded as 50% or more.

With the thirteenth aspect of the present invention, it is possible to manufacture the optical element by setting the ratio of the thickness of the gate with respect to the thickness of the part in the cavity where the optical function part of the optical element main body is molded to be the preferable value for suppressing the transcription failure of the resin material.

The optical element manufacturing method according to a fourteenth aspect is an optical element manufacturing method which manufactures an optical element through resin molding by curing a molten resin material that is filled into a cavity though a gate, wherein, under a state where the gate is formed at a position which corresponds to a side face of an optical element main body molded in the cavity, the optical element is manufactured by setting a ratio of cross sectional area in a thickness direction of the gate with respect to a cross sectional area in a thickness direction of a part in the cavity where an optical function part of the optical element main body is molded as 50% or more.

With the fourteenth aspect of the present invention, it is possible to manufacture the optical element by setting the ratio of the cross sectional area in the thickness direction of the gate with respect to the cross sectional area in the thickness direction of the part in the cavity where the optical function part of the optical element main body is molded to be the preferable value for suppressing the transcription failure of the resin material.

The optical element manufacturing method according to a fifteenth aspect is an optical element manufacturing method which manufactures an optical element through resin molding by curing a molten resin material that is filled into a cavity though a gate, wherein, under a state where the gate is formed at a position which corresponds to a side face of an optical element main body molded in the cavity, the optical element is manufactured by setting a ratio of thickness of the gate with respect to thickness of a part in the cavity where an optical function part of the optical element main body is molded as 50% or more, and setting a ratio of cross sectional area in a thickness direction of the gate with respect to a cross sectional area in a thickness direction of a part in the cavity where an optical function part of the optical element main body is molded as 50% or more.

With the fifteenth aspect of the present invention, it is possible to manufacture the optical element by setting the ratio of the thickness of the gate with respect to the thickness of the part in the cavity where the optical function part of the optical element main body is molded to be the preferable value for suppressing the transcription failure of the resin material, and setting the ratio of the cross sectional area in the thickness direction of the gate with respect to the cross sectional area in the thickness direction of the part in the cavity where the optical function part of the optical element main body is molded to be the preferable value for suppressing the transcription failure of the resin material.

The optical element manufacturing method according to a sixteenth aspect is the optical element manufacturing method according to any one of the thirteenth to fifteenth aspects, wherein the optical element is formed under a state where the gate is formed at a position that faces towards a center part of a cross section in a thickness direction of the optical function part of the optical element main body.

With the sixteenth aspect of the present invention, further, it is possible to form the optical element under the state where the gate is formed at the position which is preferable for suppressing the transcription failure of the resin material.

The optical element manufacturing method according to a seventeenth aspect is an optical element manufacturing method according to any one of the thirteenth to fifteenth aspects, wherein a lens is formed as the optical element.

With the seventeenth aspect of the present invention, further, it is possible to form the lens in a shape which is preferable for suppressing the transcription failure of the resin material.

The optical element manufacturing method according to a eighteenth aspect is an optical element manufacturing method according to the sixteenth aspect, wherein a lens is formed as the optical element.

With the eighteenth aspect of the present invention, further, it is possible to form the lens in a shape which is preferable for suppressing the transcription failure of the resin material.

With the optical element according to the first aspect of the present invention, the ratio of the thickness of the gate with respect to the thickness of the optical function part of the optical element main body can be set as a preferable value for suppressing the transcription failure of the resin material. As a result, transcription failure of the resin material can be easily but surely suppressed so that it enables to manufacture the optical element with an excellent optical performance at a low cost while improving the yield.

With the optical element according to the second aspect, the ratio of the cross sectional area in the thickness direction of the gate with respect to the cross sectional area in the thickness direction of the optical function part of the optical element main body can be set as a preferable value for suppressing the transcription failure of the resin material. As a result, transcription failure of the resin material can be easily but surely suppressed so that it enables to manufacture the optical element with an excellent optical performance at a low cost while improving the yield.

With the optical element according to the third aspect, the ratio of the thickness of the gate with respect to the thickness of the optical function part of the optical element main body and the ratio of the cross sectional area in the thickness direction of the gate with respect to the cross sectional area in the thickness direction of the optical function part of the optical element main body can both be set as the preferable values for suppressing the transcription failure of the resin material. As a result, transcription failure of the resin material can be easily but surely suppressed so that it enables to manufacture the optical element with an excellent optical performance at a low cost while further improving the yield.

With the optical element according to the fourth aspect, further, the gate part can be formed at a position which is preferable for suppressing the transcription failure of the resin material. As a result, in addition to the effects of the optical element according to the first to third aspects, it enables to achieve the optical element in which the transcription failure can be suppressed more effectively.

With the optical element according to the fifth aspect, further, the lens can be formed in a shape which is preferable for suppressing the transcription failure of the resin material. As a result, in addition to the effects of the optical element according to the first to third aspects, it enables to achieve the optical element in which the transcription failure can be suppressed more easily but surely.

With the optical element according to the sixth aspect, further, the lens can be formed in a shape which is preferable for suppressing the transcription failure of the resin material.

As a result, in addition to the effects of the optical element according to the fourth aspect, it enables to achieve the optical element in which the transcription failure can be suppressed more easily but surely.

With the optical element molding die according to the seventh aspect, the ratio of the thickness of the gate with respect to the thickness of the part in the cavity where the optical function part of the optical element main body is molded can be set as a preferable value for suppressing the transcription failure of the resin material. As a result, transcription failure of the resin material can be easily but surely suppressed so that it enables to achieve the optical element molding die which can manufacture the optical element with an excellent optical performance at a low cost while improving the yield.

With the optical element molding die according to the eighth aspect, the ratio of the cross sectional area in the thickness direction of the gate with respect to the cross sectional area in the thickness direction of the part in the cavity where the optical function part of the optical element main body is molded can be set as a preferable value for suppressing the transcription failure of the resin material. As a result, transcription failure of the resin material can be easily but surely suppressed so that it enables to achieve the optical element molding die which can manufacture the optical element with an excellent optical performance at a low cost while improving the yield.

With the optical element molding die according to the ninth aspect, it is possible to achieve the optical element, in which the ratio of the thickness of the gate with respect to the thickness of the part in the cavity where the optical function part of the optical element main body is molded can be set as a preferable value for suppressing the transcription failure of the resin material, and the ratio of the cross sectional area in the thickness direction of the gate with respect to the cross sectional area in the thickness direction of the part in the cavity where the optical function part of the optical element main body is molded can be set as a preferable value for suppressing the transcription failure of the resin material.

With the optical element molding die according to the tenth aspect of the present invention, further, the gate can be formed at a position which is more preferable for suppressing the transcription failure of the resin material. As a result, in addition to the effects of the optical element molding die according to the seventh to ninth aspects, it enables to achieve the optical element molding die which can suppress the transcription failure more effectively.

With the optical element molding die according to the eleventh aspect, further, the shape of the die can be formed in a shape which is preferable for suppressing the transcription failure of the resin material. As a result, in addition to the effects of the optical element molding die according to the seventh to ninth aspects, it enables to achieve the optical element molding die which can suppress the transcription failure more easily but surely.

With the optical element molding die according to the twelfth aspect, further, the shape of the die can be formed in a shape which is preferable for suppressing the transcription failure of the resin material. As a result, in addition to the effects of the optical element molding die according to the tenth aspect, it enables to achieve the optical element molding die which can suppress the transcription failure more easily but surely.

With the optical element manufacturing method according to the thirteenth aspect, it is possible to manufacture the optical element by setting the ratio of the thickness of the gate with respect to the thickness of the part in the cavity where the optical function part of the optical element main body is molded to be the preferable value for suppressing the transcription failure of the resin material. As a result, transcription failure of the resin material can be easily but surely suppressed so that it enables to achieve the optical element manufacturing method which can manufacture the optical element with an excellent optical performance at a low cost while improving the yield.

With the optical element manufacturing method according to the fourteenth aspect, it is possible to manufacture the optical element by setting the ratio of the cross sectional area in the thickness direction of the gate with respect to the cross sectional area in the thickness direction of the part in the cavity where the optical function part of the optical element main body is molded to be the preferable value for suppressing the transcription failure of the resin material. As a result, transcription failure of the resin material can be easily but surely suppressed so that it enables to achieve the optical element manufacturing method which can manufacture the optical element with an excellent optical performance at a low cost while improving the yield.

With the optical element manufacturing method according to the fifteenth aspect, it is possible to manufacture the optical element by setting the ratio of the thickness of the gate with respect to the thickness of the part in the cavity where the optical function part of the optical element main body is molded to be the preferable value for suppressing the transcription failure of the resin material, and setting the ratio of the cross sectional area in the thickness direction of the gate with respect to the cross sectional area in the thickness direction of the part in the cavity where the optical function part of the optical element main body is molded to be the preferable value for suppressing the transcription failure of the resin material. As a result, transcription failure of the resin material can be easily but surely suppressed so that it enables to achieve the optical element manufacturing method which can manufacture the optical element with an excellent optical performance at a low cost while further improving the yield.

With the optical element manufacturing method according to the sixteenth aspect, further, it is possible to manufacture the optical element under the state where the gate is formed at a position which is preferable for suppressing the transcription failure of the resin material. As a result, in addition to the effects of the optical element manufacturing method according to the thirteenth to fifteenth aspects, it enables to achieve the optical element manufacturing method which can suppress the transcription failure of the resin material more effectively.

With the optical element manufacturing method according to the seventeenth aspect, further, it is possible to form the lens in a shape which is preferable for suppressing the transcription failure of the resin material. As a result, in addition to the effects of the optical element manufacturing method according to the thirteenth to fifteenth aspects, it enables to achieve the optical element manufacturing method which can suppress the transcription failure of the resin material more easily but surely.

With the optical element manufacturing method according to the eighteenth aspect, further, it is possible to form the lens in a shape which is preferable for suppressing the transcription failure of the resin material. As a result, in addition to the effects of the optical element manufacturing method according to the sixteenth aspect, it enables to achieve the optical element manufacturing method which can suppress the transcription failure of the resin material more easily but surely.

DESCRIPTION OF THE PREFERRED EMBODIMENTS

An embodiment of the optical element according to the present invention will be described hereinafter by referring to FIG. 1-FIG. 3.

Figure 1:
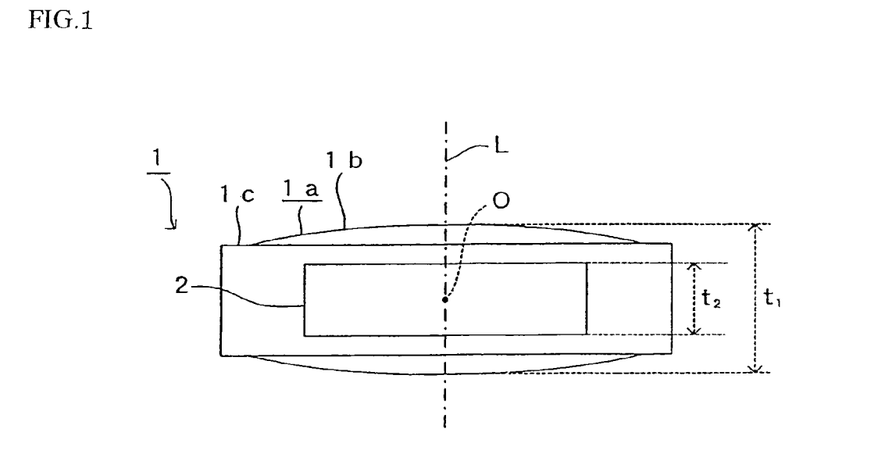
FIG. 1 is a schematic illustration for describing a lens as an optical element in an embodiment of an optical element according to the present invention.

As shown in FIG. 1, the optical element of the embodiment is a resin-made lens 1 whose both lens faces are formed in convex shape, which can be preferably used for an optical system within an optical pickup device or for an optical system for taking images, etc. This lens 1 is formed by performing injection molding of a resin material using a lens molding die 7 (see FIG. 4) which will be described later.

The optical element may not be the convex lens as the lens 1 but may be a concave lens or diffraction grating.

As a resin material, it is preferable to use olefin-based resin, polycarbonate, polyether imide, and the like.

Figure 2:
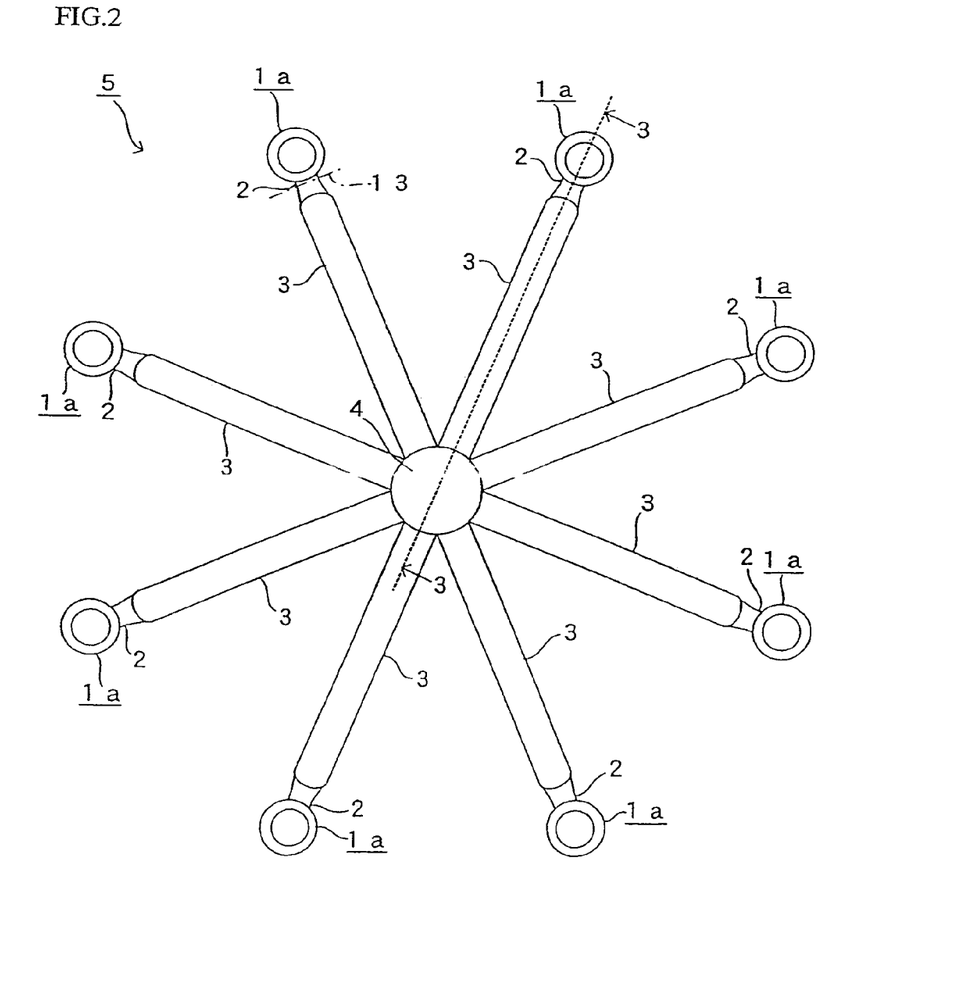
FIG. 2 is a plan view for showing a molded lens item in the embodiment of the optical element according to the present invention.
Figure 3:
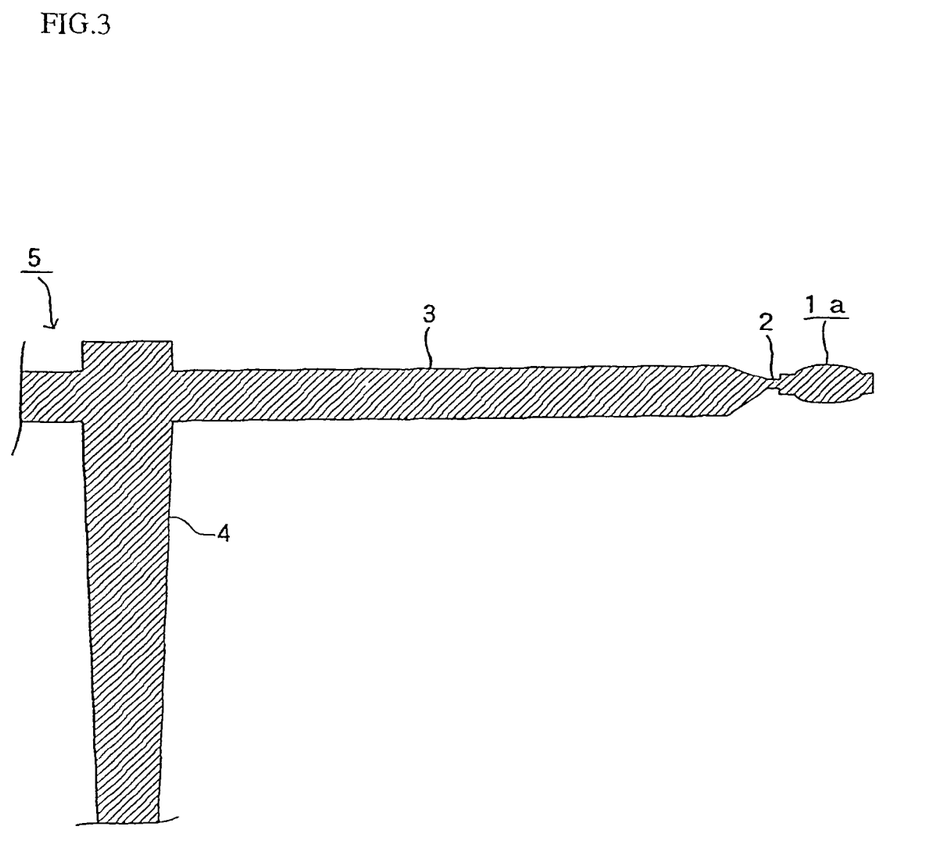
FIG. 3 is a cross section taken along the line 3-3 of FIG. 2.

As shown in FIG. 2 and FIG. 3, in the initial state of molding, the lens 1 is in a form of a molded lens item 5 in which a molded part (lens main body 1a) within a cavity 10 of the lens molding die 7, a molded part (referred to as a gate part 2 hereinafter) within a gate 14, a molded part (referred to as a runner part 3 hereinafter) within a runner 15, and a molded part (referred to as a spool part 4 hereinafter) within a spool 16 are integrally formed.

The molded lens item 5 shown in FIG. 2 and FIG. 3 is so-called a molded lens item for making eight pieces, in which eight runner parts 3 are extended radially from the outer peripheral face of a single spool part 4 and a total of eight lens main bodies 1a are formed at the tip of each runner part 3 through the respective gate part 2.

By cutting and separating each lens main body 1a from the molded lens item 5 along each gate part 2 that is connected to each lens main body 1a at a cut line 13 of FIG. 2, each of the lenses 1, which is in the state where a part of the gate part 2 is integrally formed in the side face of the lens main body 1a, can be obtained as an optical element main body as shown in FIG. 1.

It is not limited to be cut in this manner but only the lens main body 1a may be separated to form the lens 1 so that the gate part 2 is not remained in the side face of the lens main body 1a.

In the embodiment, the lens main body 1a is constituted with an optical function part 1b that has both lens faces, and a flange part 1c that has a horizontal surface orthogonal to an optical axis L, which is molded integrally with the optical function part 1b on the outer side thereof. However, the flange part may be molded only when necessary.

As shown in FIG. 1, the lens 1 in this embodiment is formed to have the ratio of thickness t2 of the gate part 2 to be 50% or more with respect to thickness t1 (center thickness) of the optical function part 1b of the lens main body 1a.

There is a correlation as shown in a following TABLE 1 recognized between the ratio of the thickness of the gate 14 with respect to the thickness t1 of the optical function part 1b of the lens main body 1a and the generation rate of appearance inferior caused by the transcription, failure of the resin material. The generation rate of the appearance inferior herein is the generation rate of the transcription failure that is generated on the lens face, which can be visually identified (including the case of using a magnifying lens such as a microscope).

Data of five kinds of samples (samples 1-5) in TABLE 1 is the data obtained as a result of appearance inferior judging test (visual test), which was performed, respectively, on a large number of the same kinds of samples obtained by performing molding of over 5,000,000 shots.

TABLE 1

| SAMPLE | LENS THICKNESS (mm²) | GATE THICKNESS (mm²) | GATE THICKNESS/ LENS THICKNESS | APPEARANCE INFERIOR GENERATION RATE |
|---|---|---|---|---|
| 1 | 1.7 | 0.6 | 35.29% | 2.59% |
| 2 | 0.97 | 0.4 | 41.24% | 0.70% |
| 3 | 1.7 | 0.8 | 47.06% | 0.87% |
| 4 | 1.6 | 0.8 | 50.00% | 0.03% |
| 5 | 1.3 | 0.7 | 53.85% | 0.00% |

As in TABLE 1, it can be seen that the generation rate of the appearance inferior radically decreases when the ratio (gate thickness/lens thickness in TABLE 1) of the thickness of the gate 14 (the gate thickness in TABLE 1) with respect to the thickness t1 of the optical function part 1b of the lens main body 1a (lens thickness in TABLE 1) becomes 50% or more.

Thus, in the embodiment, the ratio of the thickness t2 of the gate part 2, which corresponds to the thickness of the gate 14, with respect to the thickness t1 of the optical function part 1b of the lens main body 1a can be set as a preferable value (50% or more) for suppressing the transcription failure of the resin material.

Further, the lens 1 of the embodiment is formed in such a manner that the ratio of the area of the cross section in the thickness direction of the gate part 2 (referred to as the cross sectional area in the thickness direction of the gate part 2 hereinafter) with respect to the area of the cross section in the thickness direction of the optical function part 1b of the lens main body 1a (referred to as the cross sectional area in the thickness direction of the optical function part 1b of the lens main body 1a hereinafter) is set as 50% or more.

There is a correlation as shown in a following TABLE 2 recognized between the ratio of the cross sectional area in the thickness direction of the gate 14 with respect to the cross sectional area in the thickness direction of the optical function part 1b of the lens main body 1a and the generation rate of the appearance inferior caused by the transcription failure of the resin material.

The data of each sample (samples 1-5) in TABLE 2 is the data of the same sample which has the same number as in TABLE 1, and the number of molding for each sample is over 5,000,000 shots.

As in TABLE 2, it can be seen that the generation rate of the appearance inferior radically decreases when the ratio (gate cross sectional area/lens cross sectional area in TABLE 2) of the cross sectional area in the thickness direction of the gate 14 (the gate cross sectional area in TABLE 2) with respect to the cross sectional area in the thickness direction of the optical function part 1b of the lens main body 1a (lens cross sectional area in TABLE 2) becomes 50% or more.

Thus, in the embodiment, the ratio of the cross sectional area in the thickness direction of the gate part 2, which corresponds to the cross sectional area in the thickness direction of the gate 14, with respect to the cross sectional area in the thickness direction of the optical function part 1b of the lens main body 1a can be set as a preferable value (50% or more) for suppressing the transcription failure of the resin material.

As a more preferable embodiment, as shown in FIG. 1, the gate part 2 is formed at a position that faces towards the center part 0 of the cross section in the thickness direction of the optical function part 1b of the lens main body 1a.

With this, the resin material can be uniformly injected from the gate 14 into the cavity 10. Thus, the transcription failure of the resin material can be more effectively suppressed.

Figure 4:
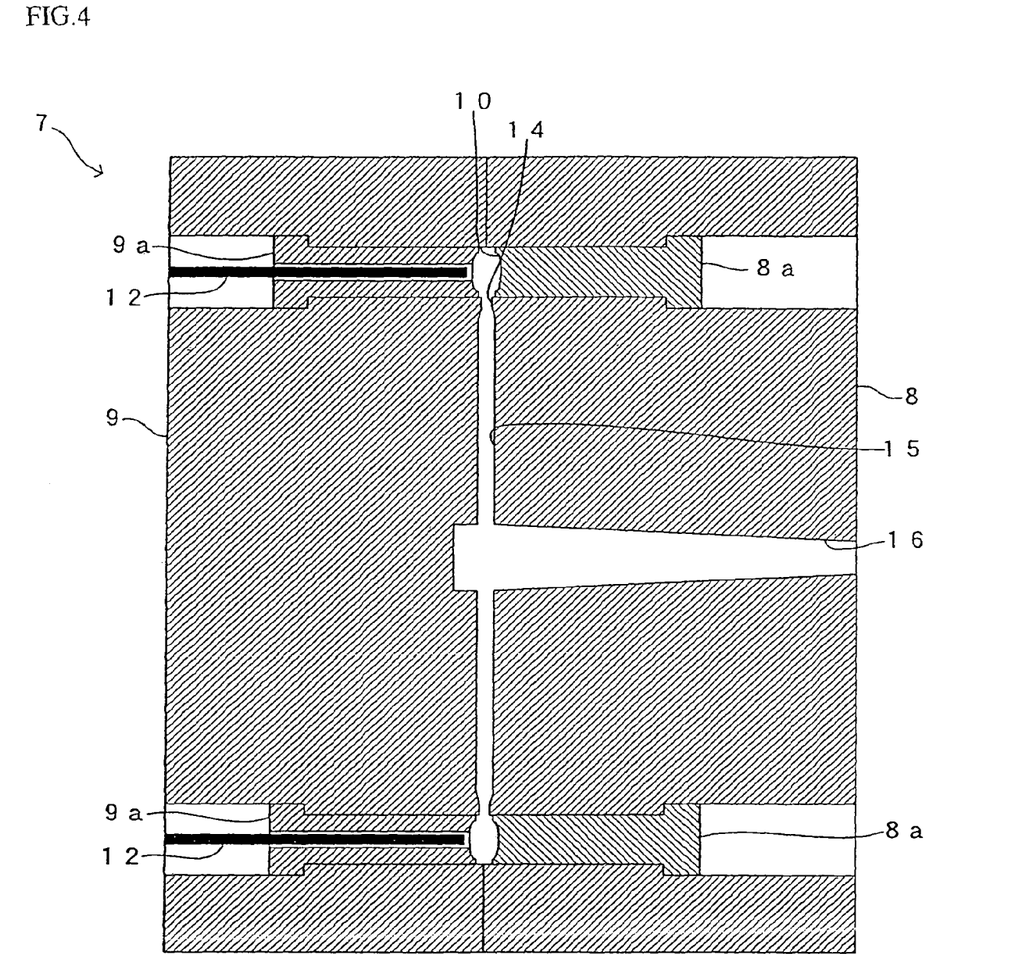
FIG. 4 is a cross section for schematically showing a lens molding die in an embodiment of an optical element molding die according to the present invention.

Next, there is described an embodiment of an optical element molding die according to the present invention by referring to FIG. 4.

As shown in FIG. 4, an optical element molding die 7 of this embodiment is a lens molding die 7 for making eight pieces, which injection-molds the lens 1 shown in FIG. 1.

This lens molding die 7 comprises a fixed-side die 8 which is held to be immobile and a movable-side die 9 which can be brought in touch and separated from the fixed-side die 8. In the fixed-side die 8 and the movable-side die 9 at positions opposing to each other, there are provided insert members 8a and 9a to which lens faces are formed, respectively.

Under the state where the movable-side die 9 is brought in touch with the fixed-side die 8, the cavity 10 as a space for molding the lens main body 1a is formed between the both insert members 8a and 9a.

At the time of molding the lens 1, the resin material is to be injected and filled into the cavity 10.

TABLE 2

| SAMPLE | LENS CROSS SECTIONAL AREA (mm²) | GATE CROSS SECTIONAL AREA (mm²) | GATE CROSS SECTIONAL AREA/ LENS CROSS SECTIONAL AREA | APPEARANCE INFERIOR GENERATION RATE |
|---|---|---|---|---|
| 1 | 1.7 | 0.48 | 28.24% | 2.59% |
| 2 | 0.97 | 0.4 | 41.24% | 0.70% |
| 3 | 1.7 | 0.64 | 37.65% | 0.87% |
| 4 | 1.6 | 0.8 | 50.00% | 0.03% |
| 5 | 1.3 | 0.7 | 53.85% | 0.00% |

Further, ejector pins 12 are provided on the cavity 10 side of the movable-side die 9. By pressing the lens main body 1*a* by the ejector pins 12, the movable-side die 9 can be appropriately separated from the molded lens item 5 held to the fixed-side die 8.

The cavity 10 has the gate 14, the runner 15, and the spool 16 connected therewith as the passageway of the resin material. Thereby, molten resin material can be supplied into the cavity 10 from the spool 16 side by passing through the runner 15 and the gate 14 in order.

The lens molding die 7 of this embodiment is a lens molding die 7 for making eight pieces in which eight runners 15 are connected radially from the spool 16 and a total of eight cavities 10 are connected to the tip of each runner 15 through the respective gate 14.

Further, the gate 14 is formed at a position which corresponds to the side face of the lens main body 1*a* molded within the cavity 10, i.e. at the side part of the cavity 10.

In the embodiment, the ratio of the thickness of the gate 14 is set as 50% or more with respect to the thickness in the part of the cavity 10 where the optical function part 1*b* of the lens main body 1*b* is molded.

As shown in TABLE 1, there is a correlation recognized between the ratio of the thickness of the gate 14 with respect to the thickness t1 of the optical function part 1*b* of the lens main body 1*a* and the generation rate of appearance inferior caused by the transcription failure of the resin material. It can be seen that the generation rate of the appearance inferior radically decreases when the ratio of the thickness of the gate 14 with respect to the thickness t1 of the optical function part 1.*b* of the lens main body 1*a* becomes 50% or more.

Thus, in the embodiment, the ratio of the thickness of the gate 14 with respect to the thickness in the part of the cavity 10 where the optical function part 1*b* of the lens main body 1*a* is molded, which corresponds to the thickness t1 of the optical function part 1*b* of the lens main body 1*a*, can be set as a preferable value (50% or more) for suppressing the transcription failure of the resin material.

Further, in the embodiment, the ratio of the cross sectional area in the thickness direction of the gate part 2 with respect to the cross sectional area in the thickness direction of the optical function part 1*b* of the lens main body 1*a* hereinafter is set as 50% or more.

As shown in TABLE 1, there is a correlation recognized between the ratio of the cross sectional area in the thickness direction of the gate 14 with respect to the cross sectional area in the thickness direction of the optical function part 1*b* of the lens main body 1*a* and the generation rate of the appearance inferior caused by the transcription failure of the resin material. It can be seen that the generation rate of the appearance inferior radically decreases when the ratio of the cross sectional area in the thickness direction of the gate 14 with respect to the cross sectional area in the thickness direction of the optical function part 1*b* of the lens main body 1*a* becomes 50% or more.

Thus, in the embodiment, the ratio of the cross sectional area in the thickness direction of the gate 14 with respect to the cross sectional area in the thickness direction of the part in the cavity 10 where the optical function part 1*b* of the lens main body 1*a* is molded, which corresponds to the cross sectional area in the thickness direction of the optical function part 1*b* of the lens main body 1*a*, can be set as a preferable value (50% or more) for suppressing the transcription failure of the resin material.

As a more preferable embodiment, the gate 14 is formed at a position that faces towards the center part of the cross section in the thickness direction of the part in the cavity 10 where the optical function part 1*b* of the lens main body 1*a* is molded.

With this, the resin material can be uniformly injected from the gate 14 into the cavity 10. Thus, the transcription failure of the resin material can be more effectively suppressed.

Next, an embodiment of the optical element manufacturing method according to the present invention will be described.

In the embodiment, the lens 1 is manufactured as an optical element by using the above-described lens molding die 7 which is formed in such a manner that the ratio of the thickness of the gate 14 with respect to the thickness of the part in the cavity 10 where the optical function part 1*b* of the lens main body 1*a* is molded is set as 50% or more, and also the ratio of the cross sectional area in the thickness direction of the gate 14 with respect to the cross sectional area in the thickness direction of the part in the cavity 10 where the optical function part 1*b* of the lens main body 1*a* is molded is set as 50% or more That is, first, under the state where the movable-side die 9 is brought in contact with the fixed-side die 8, a molten resin material is supplied into the spool 16 through a hopper, a screw, and a heating cylinder, not shown, which are disposed on the supply side of the resin material.

The molten resin material supplied into the spool 16 flows into the eight runners 15 which are connected to the spool 16. Further, it is injected and filled into the cavity 10 from each runner 15 through the gate 14.

Then, after filling the molten resin material in each cavity 10, the lens molding die 7 is cooled for curing the resin material within the die 7.

Thereby, in the lens molding die 7, the molded lens item 5 is integrally molded, in which the cavity part (lens main body 1*a*), the gate part 2, the spool part 4 are continuously formed.

Subsequently, after separating the movable-side die 9 from the fixed-side die 8, the lens main body 1*a* along with the gate part 2 is cut and separated from the molded lens item 5 for obtaining the lens 1.

In the lens 1 manufactured in this manner, transcription failure is effectively decreased so that an excellent optical performance can be achieved.

Therefore, with the present invention, the ratio of the thickness of the gate 14 (corresponds to the thickness t2 of the gate part 2) with respect to the thickness t1 of the optical function part 1*b* of the lens main body 1*a* (corresponds to the thickness of the part in the cavity 10 where the optical function part 1*b* of the lens main body 1*a* is molded) and the ratio of the cross sectional area in the thickness direction of the gate 14 (corresponds to the cross sectional area in the thickness direction of the gate part 2) with respect to the cross sectional area in the thickness direction of the optical function part 1*b* of the lens main body 1*a* (corresponds to the cross sectional area in the thickness direction of the part in the cavity 10 where the optical function part 1*b* of the lens main body 1*a* is molded) can both be set as the preferable values for suppressing the transcription failure of the resin material.

As a result, transcription failure of the resin material can be suppressed easily but surely, and the lens 1 with excellent optical performance can be manufactured at a low cost while improving the yield.

The present invention is not limited to the above-described embodiments but various modifications are possible as necessary.

Figure 5:
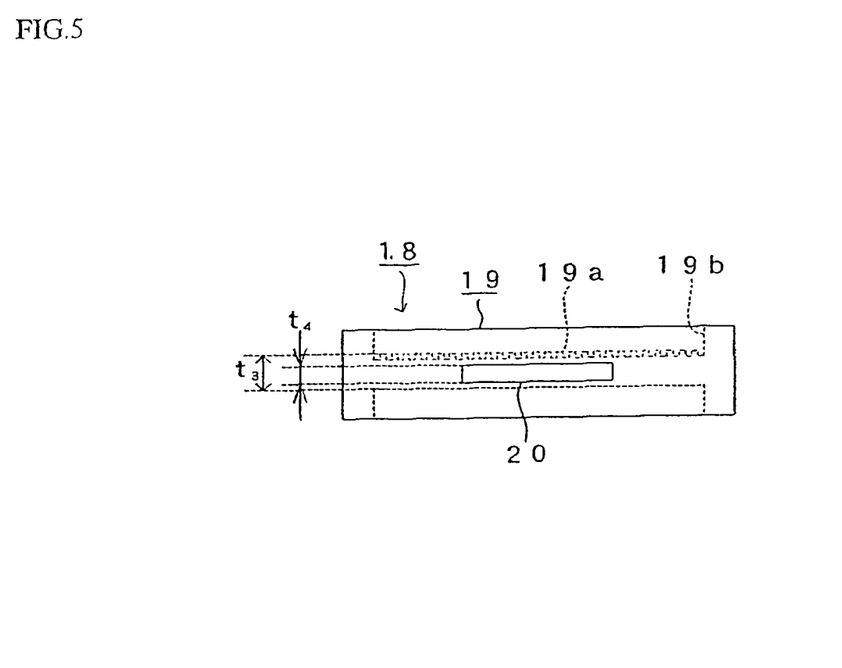
FIG. 5 is a schematic illustration for describing diffraction grating as an optical element in an embodiment of the optical element according to the present invention.

For example, as shown in FIG. 5, when the present invention is applied to diffraction grating 18 as the optical element, the face of a diffraction grating main body 19, which is orthogonal to the diffraction grating forming face, becomes the side face, and a gate part 20 is formed on the side face.

The diffraction grating 18 of FIG. 5 is formed in such a manner that the diffraction grating main body 19 comprises an optical function part 19a where the diffraction grating is formed and a tubular frame part 19b which is integrally formed therewith by surrounding the optical function part 19a.

In this case, like the case of the lens 1, transcription failure of the resin material can also be suppressed easily but surely, and it enables to achieve an excellent effect, i.e. the diffraction grating 18 with excellent optical performance can be manufactured at a low cost while improving the yield, by setting at least either the ratio of a thickness t4 of the gate part 20 with respect to thickness t3 of the optical function part 19a of the diffraction grating main body 19 or the ratio of the cross sectional area in the thickness direction of the gate part 20 with respect to the cross sectional area in the thickness direction of the optical function part 19a of the diffraction grating main body 19 to be 50% or more.

Figure 6:
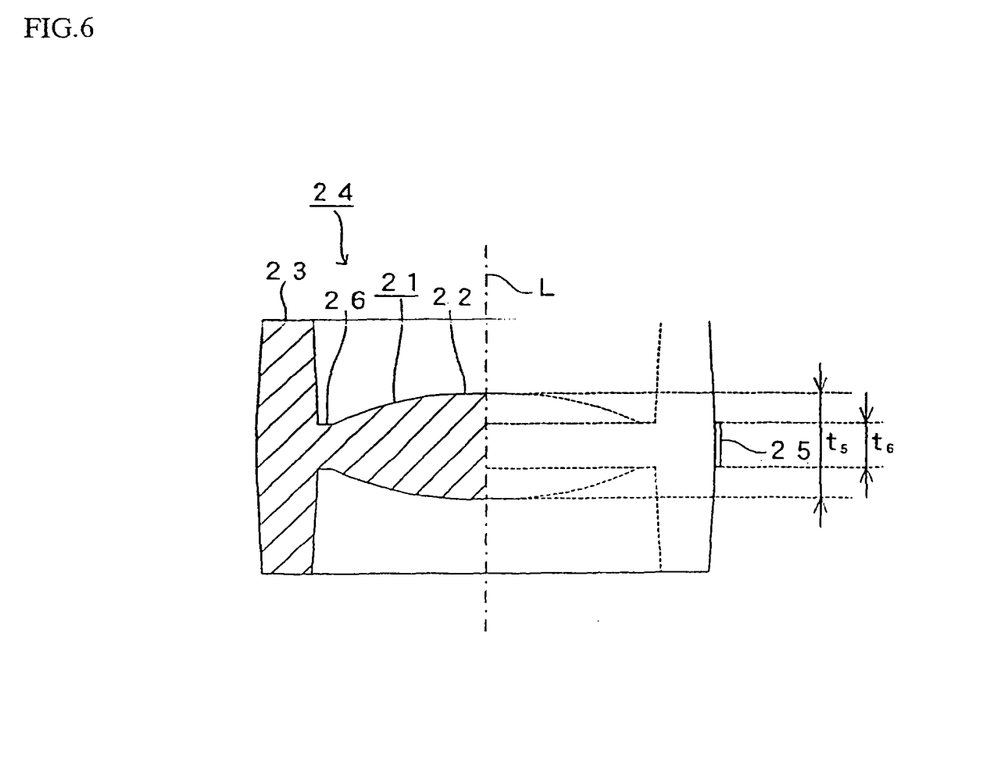
FIG. 6 is a schematic illustration for describing a lens as an optical element, which is different from that of FIG. 1, in an embodiment of the optical element according to the present invention.

Further, as shown in FIG. 6, the present invention is also effectively applied to a lens 24 in which a flange part 26 with a flat face orthogonal to the optical axis L is integrally formed on the outer side of an optical function part 22 of a lens main body 21 and, on the outer side thereof, a lens barrel part 23 extending in a direction of the optical axis L is integrally formed. In this case, it is also possible to achieve the same effects as the case of the above-described lens 1 by setting at least either the ratio of thickness t6 of a gate part 25 with respect to thickness t5 of the optical function part 22 of the lens main body 21 or the ratio of the cross sectional area in the thickness direction of the gate part 25 with respect to the cross sectional area in the thickness direction of the optical function part 22 of the lens main body 21 to be 50% or more.

Further, in the above-described embodiments, thermoplastic resin is described as a molding material for the lens 1. However, it is also possible to apply the present invention to the case where thermosetting resin is used as a molding material for the optical element.

What is claimed is:

1. An optical element manufacturing method which manufactures an optical element through resin molding by curing a molten resin material that is filled into a cavity though a gate, wherein
    under a state where said gate is formed at a position which corresponds to a side face of an optical element main body molded in said cavity,
    said optical element is manufactured by setting a ratio of thickness of said gate with respect to thickness of a part in said cavity where an optical function part of said optical element main body is molded as 50% or more.

2. An optical element manufacturing method which manufactures an optical element through resin molding by curing a molten resin material that is filled into a cavity though a gate, wherein
    under a state where said gate is formed at a position which corresponds to a side face of an optical element main body molded in said cavity,
    said optical element is manufactured by setting a ratio of cross sectional area in a thickness direction of said gate with respect to a cross sectional area in a thickness direction of a part in said cavity where an optical function part of said optical element main body is molded is set as 50% or more.

3. An optical element manufacturing method which manufactures an optical element through resin molding by curing a molten resin material that is filled into a cavity though a gate, wherein
    under a state where said gate is formed at a position which corresponds to a side face of an optical element main body molded in said cavity,
    said optical element is manufactured by setting a ratio of thickness of said gate with respect to thickness of a part in said cavity where an optical function part of said optical element main body is molded as 50% or more, and setting a ratio of cross sectional area in a thickness direction of said gate with respect to a cross sectional area in a thickness direction of a part in said cavity where an optical function part of said optical element main body is molded as 50% or more.

4. The optical element manufacturing method according to any one of claims 1-3, wherein said optical element is formed under a state where said gate is formed at a position that faces towards a center part of a cross section in a thickness direction of said optical function part of said optical element main body.

5. The optical element manufacturing method according to any one of claims 1-3, wherein a lens is formed as said optical element.

6. The optical element manufacturing method according to claim 4, wherein a lens is formed as said optical element.

* * * * *